(12) United States Patent
Ota et al.

(10) Patent No.: US 9,183,740 B2
(45) Date of Patent: Nov. 10, 2015

(54) TRAVEL PATTERN GENERATION DEVICE

(75) Inventors: Yuko Ota, Tokyo (JP); Masahiko Ikawa, Tokyo (JP); Norihiro Nishiuma, Tokyo (JP); Yoshitsugu Sawa, Tokyo (JP); Hiroyuki Kumazawa, Tokyo (JP); Takashi Irie, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 230 days.

(21) Appl. No.: 13/383,350

(22) PCT Filed: Sep. 15, 2010

(86) PCT No.: PCT/JP2010/005622
§ 371 (c)(1),
(2), (4) Date: Jan. 10, 2012

(87) PCT Pub. No.: WO2011/036855
PCT Pub. Date: Mar. 31, 2011

(65) Prior Publication Data
US 2012/0109510 A1      May 3, 2012

(30) Foreign Application Priority Data
Sep. 24, 2009   (JP) ................... 2009-219011

(51) Int. Cl.
*B60W 30/00*   (2006.01)
*G08G 1/01*    (2006.01)
(Continued)

(52) U.S. Cl.
CPC ........... *G08G 1/0104* (2013.01); *B60W 30/188* (2013.01); *G01C 21/3469* (2013.01); *B60W 2720/103* (2013.01)

(58) Field of Classification Search
CPC ............... G01C 21/34; G01C 21/3469; G01C 21/3492; G08G 1/0104; B60W 30/188; B60W 2720/103
USPC .................. 701/117–119, 123, 423
See application file for complete search history.

(56) References Cited

U.S. PATENT DOCUMENTS 6,018,697 A *   1/2000   Morimoto et al. ............ 701/411
6,314,347 B1   11/2001   Kuroda et al.
(Continued)

FOREIGN PATENT DOCUMENTS

CN     1580706 A    2/2005
CN     1749989 A    3/2006
(Continued)

OTHER PUBLICATIONS

Office Action issued Mar. 12, 2013 in Japanese Patent Application No. 2011-532901 with English language translation.
(Continued)

*Primary Examiner* — John Q Nguyen
*Assistant Examiner* — Michael Whalen
(74) *Attorney, Agent, or Firm* — Oblon, McClelland, Maier & Neustadt, L.L.P.

(57) ABSTRACT

A travel interval division part and a low fuel consumption travel pattern generation part are included, the travel interval division part dividing, based on a reference travel pattern indicating a speed and a travel time period in a case where a vehicle travels without consideration of energy consumption and based on travel route information indicating a travel route that the vehicle travels, the travel route into a plurality of travel intervals at a plurality of reference points, the low fuel consumption travel pattern generation part determining a low fuel consumption travel pattern in which a travel time period of each travel interval falls within a predetermined range of a travel time period of each travel interval of the reference travel pattern and a cumulative speed increase amount in each travel interval is smaller than that of the reference travel pattern.

9 Claims, 8 Drawing Sheets

(51) Int. Cl.
*B60W 30/188* (2012.01)
*G01C 21/34* (2006.01)

(56) References Cited

U.S. PATENT DOCUMENTS

| | | | |
|---|---|---|---|
| 6,836,719 B2* | 12/2004 | Andersson et al. | 701/93 |
| 8,214,122 B2* | 7/2012 | Krupadanam et al. | 701/79 |
| 8,290,695 B2* | 10/2012 | Hiestermann et al. | 701/119 |
| 8,306,725 B2* | 11/2012 | Son et al. | 701/123 |
| 8,615,361 B2* | 12/2013 | Papajewski et al. | 701/533 |
| 2006/0142915 A1* | 6/2006 | Isono et al. | 701/36 |
| 2008/0221787 A1* | 9/2008 | Vavrus | 701/201 |
| 2009/0271050 A1 | 10/2009 | Niki et al. | |
| 2010/0250127 A1* | 9/2010 | Hilbrandie et al. | 701/209 |
| 2010/0286907 A1* | 11/2010 | Hilbrandie et al. | 701/201 |
| 2010/0299055 A1* | 11/2010 | Hilbrandie et al. | 701/200 |
| 2010/0299064 A1* | 11/2010 | Hilbrandie et al. | 701/209 |
| 2010/0312472 A1* | 12/2010 | Hilbrandie et al. | 701/209 |
| 2011/0029281 A1* | 2/2011 | Tsukamoto et al. | 702/176 |
| 2011/0099171 A1* | 4/2011 | Van Buer | 707/737 |
| 2011/0184642 A1* | 7/2011 | Rotz et al. | 701/201 |
| 2011/0307166 A1* | 12/2011 | Hiestermann et al. | 701/119 |
| 2012/0004838 A1* | 1/2012 | Lee et al. | 701/123 |
| 2012/0197501 A1* | 8/2012 | Sujan et al. | 701/51 |

FOREIGN PATENT DOCUMENTS

| | | |
|---|---|---|
| CN | 1800783 A | 7/2006 |
| CN | 101253388 A | 8/2008 |
| CN | 101501740 A | 8/2009 |
| DE | 10 2004 010 870 A1 | 9/2004 |
| EP | 0 372 840 A2 | 6/1990 |
| JP | 2000-333305 | 11/2000 |
| JP | 2001-183150 | 7/2001 |
| JP | 2002-188932 | 7/2002 |
| JP | 2003-187283 | 7/2003 |
| JP | 2005-3527 | 1/2005 |
| JP | 2005-115883 | 4/2005 |
| JP | 2005-146966 A | 6/2005 |
| JP | 2005-192319 | 7/2005 |
| JP | 2006-327545 A | 12/2006 |
| JP | 2007-32522 | 2/2007 |
| JP | 2008-74337 | 4/2008 |
| JP | 2009-012605 A | 1/2009 |
| JP | 2009-14576 | 1/2009 |
| JP | 2009-70101 | 4/2009 |
| KR | 20090037196 A | 4/2009 |
| WO | WO 2004/021306 A2 | 3/2004 |
| WO | WO 2008/018607 A1 | 2/2008 |

OTHER PUBLICATIONS

International Preliminary Report on Patentability and Written Opinion of the International Searching Authority issued Apr. 5, 2012, in PCT/JP2010/005622, filed Sep. 15, 2010 (with English-language translation).

International Search Report issued Dec. 28, 2010 in patent application No. PCT/JP2010/005622.

Takashi Oguchi, et al., "Carbon dioxide emission model in actual urban road vehicular traffic situations", Proceedings of JSCE, No. 695, IV-54, 2002, pp. 125-136.

Chinese Office Action issued Aug. 13, 2013, in China Patent Application No. 201080036141.9 (with English Translation).

Office Action issued Feb. 23, 2015 in German Patent Application No. 11 2010 003 789.2 (with English translation).

* cited by examiner

FIG. 4
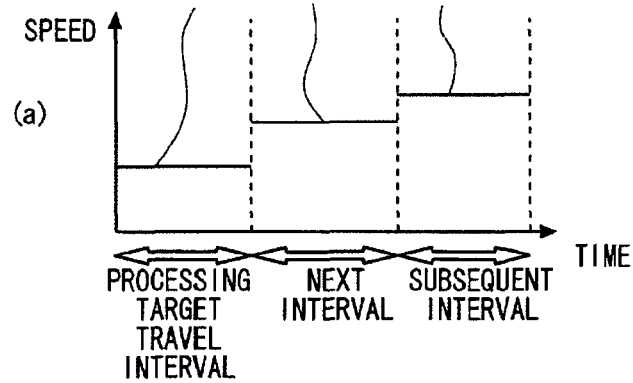
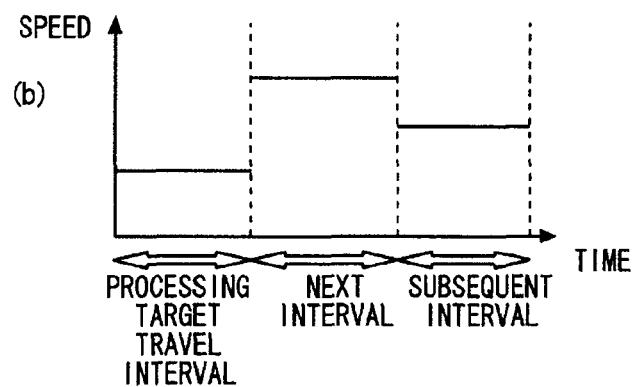
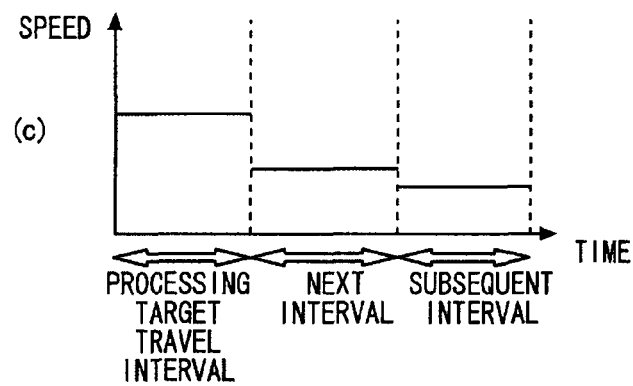
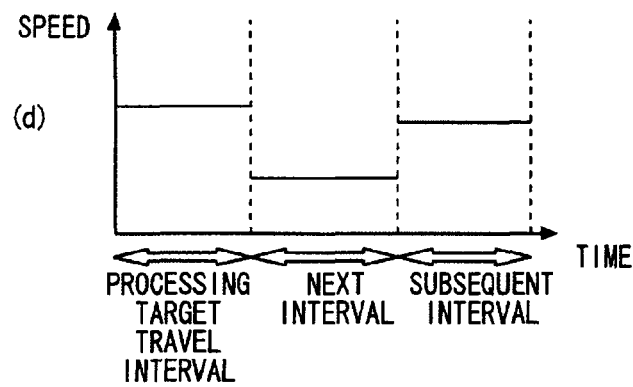

TRAVEL PATTERN GENERATION DEVICE

TECHNICAL FIELD

The present invention relates to a travel pattern generation device that generates a travel pattern of a vehicle.

BACKGROUND ART

One example of the travel pattern generation devices that generate a travel pattern for reducing energy consumed by a vehicle is the device that includes, regarding a route on which a vehicle travels, speed pattern generation means for generating a speed pattern based on set-up conditions, traffic situation acquisition means for acquiring the traffic situation, and means for generating a travel pattern of the vehicle based on the speed pattern and the traffic situation (for example, see Patent Document 1).

In the above-mentioned travel pattern generation device, in a case where travel plan generation means is capable of generating a first travel plan in which a vehicle is allowed to pass through a first intersection without making a stop, the traffic situation acquisition means acquires, as a traffic situation, traffic light information at a second intersection located farther from the first intersection when the vehicle travels in accordance with the first travel plan, and the travel plan generation means generates a second travel plan based on a first speed pattern and the traffic light information at the second intersection. This enables to generate, when a vehicle is allowed to travel through vehicle control using the first speed pattern, a second speed pattern for causing the vehicle to arrive at the intersection earlier compared with the case of the first speed pattern in a case where the light of the intersection is red and a vehicle is not allowed to pass through, to thereby generate a travel plan using the second speed pattern.

PRIOR ART DOCUMENT

Patent Document

Patent Document 1: Japanese Patent Application Laid-Open No. 2009-070101 (pp. 3 and 4, FIG. 1)

SUMMARY OF THE INVENTION

Problem to be Solved by the Invention

Unfortunately, in the above-mentioned travel pattern generation device, only the traffic light information of two intervals ahead is referred to, and acceleration is performed in accordance with the referred traffic light information, which may result in that the vehicle has to stop at the intersection three intervals ahead. Acceleration in such a case is not originally required, leading to a problem that resultantly, a larger amount of energy is consumed as fuel.

The present invention has been made to solve the above-mentioned problem, and an object thereof is to obtain a travel pattern generation device capable of generating a travel pattern in which unnecessary acceleration is reduced and the energy consumed by a vehicle is reduced further.

Means to Solve the Problem

A travel pattern generation device according to the present invention includes: a travel interval division part dividing, based on a reference travel pattern indicating a speed and a travel time period in a case where a vehicle travels without consideration of energy consumption and based on travel route information indicating a travel route that the vehicle travels, the travel route into a plurality of travel intervals at a plurality of reference points; and a low fuel consumption travel pattern generation part determining a low fuel consumption travel pattern in which a travel time period of each travel interval falls within a predetermined range of a travel time period of each travel interval of the reference travel pattern and a cumulative speed increase amount in each travel interval is less than that of the reference travel pattern.

Effects of the Invention

The travel pattern generation device according to the present invention is capable of generating a travel pattern in which unnecessary acceleration is reduced and the energy consumed by a vehicle is reduced further.

BRIEF DESCRIPTION OF DRAWINGS

FIG. 4 is a figure of speed patterns showing an example of judging a travel phase in a travel interval by the low fuel consumption travel pattern generation part of the travel pattern generation device according to the first embodiment of the present invention.

EMBODIMENTS FOR CARRYING OUT THE INVENTION

First Embodiment

Figure 1:
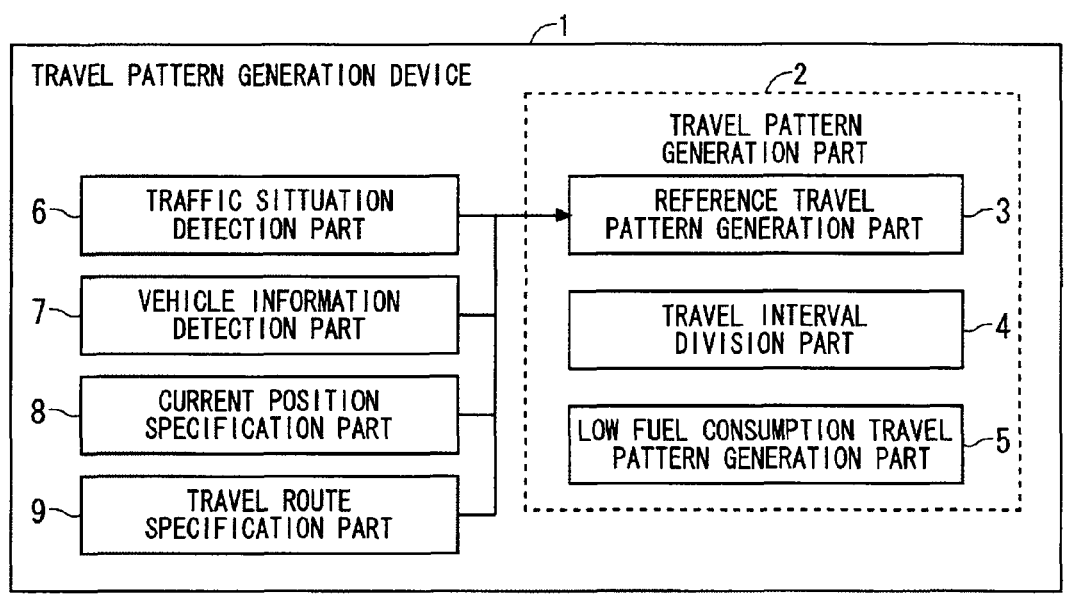
FIG. 1 is a block diagram showing a configuration of a travel pattern generation device according to a first embodiment of the present invention.

FIG. 1 is a block diagram showing a configuration of a travel pattern generation device according to a first embodiment of the present invention. Those denoted by the identical reference symbols correspond to the identical or like ones in the diagram, which is common in the entire specification.

A travel pattern generation device 1 according to the first embodiment generates, based on travel route information and traffic situation information, a low fuel consumption travel pattern regarding a travel route that an engine-driven vehicle, hybrid vehicle or electric vehicle (hereinafter, referred to as a vehicle) is to travel. As shown in FIG. 1, the travel pattern generation device 1 includes a travel pattern generation part 2, a traffic situation detection part 6, a vehicle information detection part 7, a current position specification part 8 and a travel route specification part 9.

For example, the traffic situation detection part 6 obtains, as traffic situation information, light information showing a signal indication schedule, traffic information, information of the position of the tail end of a line of vehicles waiting at a light (position of the last of a line of vehicles waiting at a light), and the surrounding situation such as the positions of other vehicles in the vicinity of the vehicle (own vehicle) on which the travel pattern generation device 1 is mounted, and then outputs the obtained traffic situation information to the travel pattern generation part 2. Examples of the measure for obtaining the traffic situation information by the traffic situation detection part 6 include the method using communication with another vehicle or roadside device, the methods using various sensors such as millimeter wave sensor, ultrasonic sensor and image sensor, and the obtaining method through learning from the travel history. In learning from the travel history, in a case of traveling the travel route that a driver has traveled at the same time in the past or in a case of a route that a driver frequently travels, the light information indicating the signal indication schedule in the past and the light position may be used as the traffic situation information. Alternatively, the light information may be used, which is presumed from the indication information of the nearby signal and relative times of the light information of respective signals on the same route that are obtained from the travel history. The traffic situation detection part 6 repeatedly obtains the traffic situation information at predetermined timings, and outputs the information to the travel pattern generation part 2 in a case of detecting the traffic situation information, in a case where a change is found in the detection results of the traffic situation information, or in a case where a request has been made.

The vehicle information detection part 7 obtains the current vehicle information of own vehicle such as speed, acceleration, fuel injection amount, and operation amount of an accelerator or brake pedal with the use of various sensors or gyros, and then outputs the obtained vehicle information to the travel pattern generation part 2. The vehicle information detection part 7 repeatedly obtains and outputs the vehicle information in a continuous manner at predetermined timings.

The current position specification part 8 performs mapping process with respect to the map information using a global positioning system (GPS) or gyroscope to specify the current position of own vehicle, and then outputs the specified current position information to the travel pattern generation part 2. The current position specification part 8 repeatedly obtains and outputs the current position information in a continuous manner at predetermined timings.

The travel route specification part 9 specifies a travel route that own vehicle travels (is presumed to travel) and outputs the specified travel route information to the travel pattern generation part 2. For example, the travel route specification part 9 may specify, as the travel route, a route for guiding to a destination that has been set by a user. Alternatively, the travel route specification part 9 may specify, as the travel route, the route that a user has frequently traveled in the past including the current position. Still alternatively, in a case where the road during the travel is a trunk road, the travel route specification part 9 may specify the route presumed from the current position and advancing direction as the travel road, for example, may specify the trunk road as the travel route. The travel route information includes intersection information, route length, speed limit, light position information, curve information, and the presence or absence of right/left turn. The travel route specification part 9 specifies the travel route at predetermined timings, and besides, when the travel is started, when the guiding route is set or changed, or when own vehicle goes off the travel route specified previously.

The travel pattern generation part 2 includes a reference travel pattern generation part 3 that generates a reference travel pattern, a travel interval division part 4 that divides the travel route into a plurality of travel intervals, and a low fuel consumption travel pattern generation part 5 that generates a low fuel consumption travel pattern. The travel pattern is represented by the speed with respect to the travel time period or the speed with respect to the travel distance.

The reference travel pattern generation part 3 generates the reference travel pattern from the current position of own vehicle on the travel route with the use of the traffic situation information, vehicle information, current position information and travel route information obtained from the traffic situation detection part 6, vehicle information detection part 7, current position specification part 8 and travel route specification part 9, respectively. The reference travel pattern is a model travel pattern in a case where a driver drives in consideration of only a traffic situation, speed limit and light indication information indicating the signal at that time, without out consideration of energy consumption.

The travel interval division part 4 sets a plurality of reference points using the reference travel pattern generated by the reference travel pattern generation part 3 and divides the travel route into a plurality of travel intervals based on the set reference points. The reference points are regarded as, in the reference travel pattern, a stop position of own vehicle, a position at which own vehicle is accelerated again after being decelerated for a predetermined amount or more, and a light position that own vehicle is presumed to pass through without making a stop. In addition, the travel interval division part 4 extracts travel features (such as distance of the travel interval and average speed and initial speed of a vehicle) for each of the divided travel intervals.

The low fuel consumption travel pattern generation part 5 refers to the travel features for each of the travel intervals divided by the travel interval division part 4, thereby generating a low fuel consumption travel pattern in which energy consumption is reduced. The low fuel consumption travel pattern generation part 5 formulates an energy consumption amount using a vehicle model, and generates the low efficiency travel pattern by solving an optimization problem using time constraints such as the time at which a vehicle passes through a light and speed constraints such as speed limit that are generated based on the travel features of each travel interval.

(Math 1) expresses the optimization problem to be solved by the low fuel consumption travel pattern generation part 5, where Q represents a fuel consumption amount, $t_n$ represents the travel end time of an n-th travel interval, and $L_n$, represents the distance of the n-th travel interval. In addition, $T_{n\ min}$ represents a minimum allowed time (for example, time when a green light starts) at the travel end time $t_n$, and $T_{n\ max}$ represents a maximum allowed time (for example, time when a green light ends) at the travel end time $t_n$. The minimum allowed time $T_{n\ min}$ and the maximum allowed time $T_{n\ max}$ of the travel end time $t_n$ are calculated using the reference travel pattern and the traffic situation information including light information.

$$\text{Minimize } Q = \int_{t_0}^{t_N} f(v(t))dt,$$

$$\text{Subject to } \int_{t_{m-1}}^{t_m} v(t)dt = L_n, T_{n\ min} \leq t_n \leq T_{n\ max}$$
$$n = 1, \ldots, N \quad \text{[Math 1]}$$

While it is assumed here that a vehicle is one on which a gasoline-engine or the like is mounted and Q represents a fuel consumption amount (unit thereof is, for example, cc), a hybrid vehicle or electric vehicle may be assumed and Q may represent an energy consumption amount (unit thereof is, for example, kW or joule (J)).

Described below is an example in a case of a gasoline engine vehicle (for example, see Non-Patent Document: Takashi Oguchi et al., "Carbon dioxide emission model in actual urban road vehicular traffic situations", proceedings of JSCE, No. 695, IV-54, pp. 125-136).

For example, a fuel consumption amount f per unit time is generally expressed by (Math 2) as a sum of a fuel consumption amount $f_i$ for keeping idling, a fuel consumption amount $f_{rr}$ due to inclination or surface resistance, a fuel consumption amount $f_{ra}$ due to air resistance, and a fuel consumption amount $f_a$ regarding a kinetic energy increase amount in acceleration.

Note that while conditions are imposed such that $f \geq f_i$ is always satisfied in Non-Patent Document above, brief description is given below for the sake of simplicity.

$$f = f_i + f_{rr} + f_{ra} + f_a \quad \text{[Math 2]}$$

It is assumed here that the following preconditions are satisfied: (1) a fuel consumption amount due to inclination or surface resistance is almost constant regardless of way of traveling; (2) an air resistance can be ignored during medium/low speed traveling in urban areas; and (3) a fuel consumption amount due to idling is proportional to travel time period. In the present embodiment, the travel route does not change between the reference travel pattern and the low fuel consumption travel pattern, and accordingly a fuel consumption amount due to inclination or surface resistance can be regarded as constant. Further, it can be considered that a fuel consumption amount due to idling is constant from the condition that the travel time period does not vary significantly between the reference travel pattern and the low fuel consumption travel pattern. From the above, the optimization problem can be simplified to one regarding the fuel consumption amount $f_a$ due to acceleration only.

In the cases of hybrid vehicles and electric vehicles, a kinetic energy increase amount generated by acceleration can be partially reused through regeneration, and thus a regeneration amount may be additionally taken into consideration. Note that the regeneration efficiency is not 100%, and accordingly the method according to the present embodiment in which an energy consumption amount (fuel consumption amount in the above-mentioned case) due to acceleration is reduced as much as possible is also applicable to the cases of hybrid vehicles and electric vehicles.

As to the time constraints, for example, the travel time periods of respective travel intervals are considered to be identical to each other between the reference travel pattern and the low fuel consumption travel pattern. In this case, solutions to the optimization problem, that is, solutions that minimize the kinetic energy due to acceleration can be sought analytically.

Note that the travel time periods of respective travel intervals are not required to be precisely identical to each other between the reference travel pattern and the low fuel consumption travel pattern, but are only required to fall within a predetermined range.

Figure 2:
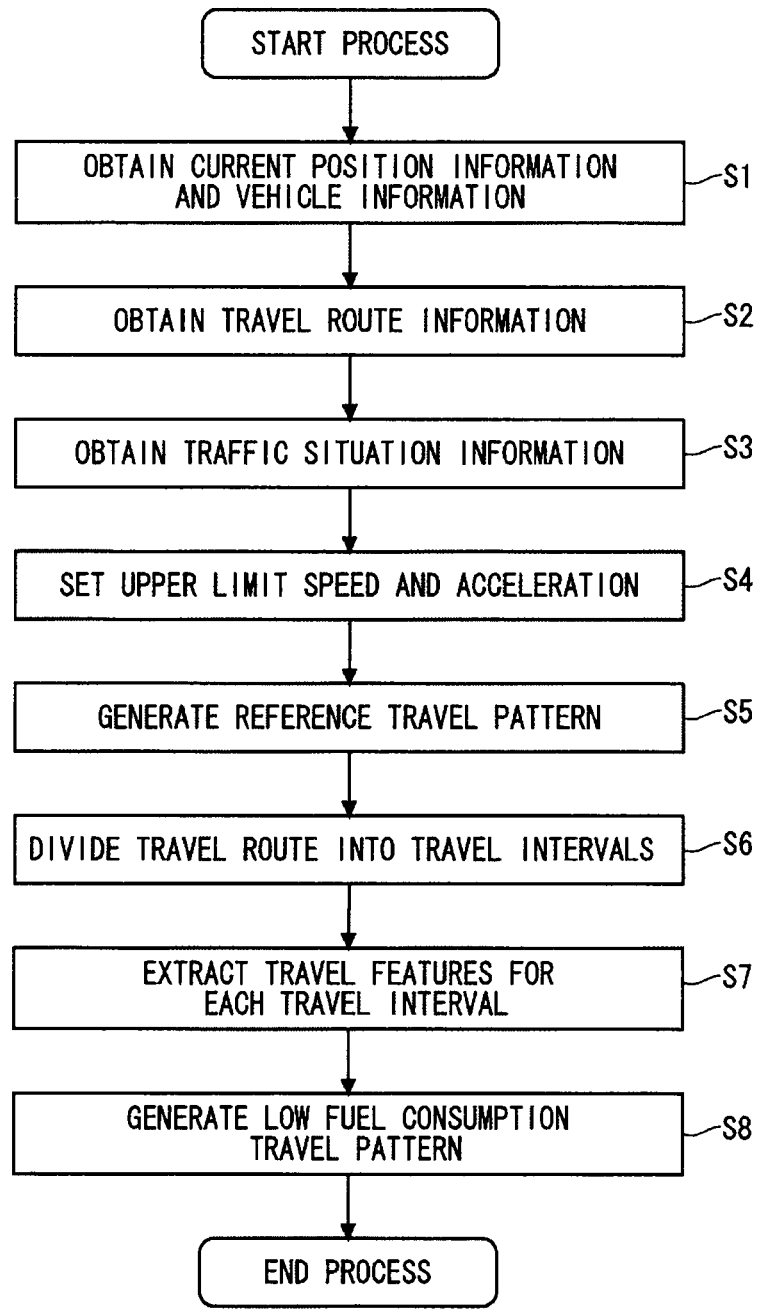
FIG. 2 is a flowchart showing an action of the travel pattern generation device according to the first embodiment of the present invention.

FIG. 2 is a flowchart showing the action of the travel pattern generation device according to the first embodiment. The action of the travel pattern generation device 1 according to the first embodiment is described.

The travel pattern generation process by the travel pattern generation device 1 shown in FIG. 2 is executed at a predetermined timing after the travel is started. For example, the process is repeatedly executed per timing at which guiding is started after setting of the route, per predetermined distance or travel for a predetermined time period, or every time a vehicle passes through the travel interval on the travel route.

First, in S1, the reference travel pattern generation part 3 obtains the current position information from the current position specification part 8 and obtains the vehicle information from the vehicle information detection part 6.

Next, in S2, the reference travel pattern generation part 3 obtains, from the travel route specification part 9, the travel route information from the current position obtained in S1 to a destination or travel route information for a given distance amount.

In S3, the reference travel pattern generation part 3 obtains, from the traffic situation detection part 7, the traffic situation information such as an indication schedule of a light located on the travel route obtained in S2 and a traffic situation in the vicinity of a vehicle.

In S4, the reference travel pattern generation part 3 sets an upper limit speed and acceleration in the reference travel pattern, based on the travel route information and the traffic situation information obtained in S2 and S3, respectively. Note that deceleration is set to a value as small as possible. The upper limit speed is set for each predetermined point on the travel route (for example, a curve point and a specific point for right/left turn on the travel route, in addition to the point at which a legal speed limit is set) based on, for example, speed limit of the travel route (legal speed limit), curve information, the presence or absence of right/left turn, and traffic information. Acceleration is used for generating a reference travel pattern and has a fixed value. The acceleration to be set may be average acceleration of typical vehicles or optimum acceleration from the viewpoint of energy consumption that is determined for each vehicle type. Alternatively, acceleration to be set may be acceleration set by a user or acceleration in a case where a user drives.

In S5, the reference travel pattern generation part 3 generates a reference travel pattern on the travel route obtained in S2 with the current position and speed of a vehicle obtained in S1 being a starting point, based on the traffic situation information obtained in S3 and the upper limit speed and acceleration set in S4. For example, in a case where the current vehicle speed is less than the upper limit speed, the reference travel pattern generation part 3 generates the reference travel pattern such that a vehicle is accelerated to the upper limit speed at the designated acceleration and keeps a constant speed at the upper limit speed. In a case where the current vehicle speed is more than the upper limit speed, the reference travel pattern generation part 3 generates the reference travel pattern such that the upper limit speed is not exceeded and a vehicle is decelerated at predetermined deceleration. Further, the reference travel pattern generation part 3 generates the reference travel pattern such that a vehicle is decelerated at predetermined deceleration and stopped so as to stop at the position of the tail end of a line of vehicles waiting at a light, a stop position from learning of a travel history, or a position at which a light is red. The reference travel pattern generated by the reference travel pattern generation part 3 in this manner is a model travel pattern in a case where a driver drives normally in consideration of only a speed limit, light indication information showing the light and a nearby traffic situation irrespective of a light indication schedule and consumption energy due to acceleration, for example, increasing a speed to an upper limit speed and stopping a vehicle when a light is red.

In S6, the travel interval division part 4 divides the travel route into a plurality of intervals based on the reference travel pattern generated in S5 and the light information. The travel interval division part 4 sets the point at which a passing-through time is limited as a reference point in accordance with a light position or traffic situation information in a case where, for example, another vehicle is present ahead due to an influence of a traffic signal, and then divides the travel route based on the set reference points. For example, the travel interval division part 4 may set the point at which a vehicle stops in the reference travel pattern as a reference point and judge that a vehicle is stopped or decelerated even at the point at which the vehicle is accelerated from a low speed equal to or less than a defined value because another vehicle is present ahead, to thereby set that point as a reference point. Further, the point of a traffic signal through which a vehicle can pass without making a stop in the reference travel pattern is also set as a reference point.

In S7, the travel interval division part 4 extracts travel features for each of the travel intervals of the travel route divided in S5. For example, the travel features to be extracted include a distance of a travel interval, initial speed, terminal speed, average speed and travel time period.

In S8, the low fuel consumption travel pattern generation part 5 generates the low fuel consumption travel pattern based on the upper limit speed and acceleration set in S3 and the travel features of each travel interval extracted in S7. The low fuel consumption travel pattern of each travel interval is generated in consideration of the travel time period and average speed of a travel interval and an average speed of intervals including that two intervals ahead. The low fuel consumption travel pattern is calculated such that a vehicle can pass through the reference point at which the vehicle is expected to be stopped or decelerated in the reference travel pattern without being stopped or decelerated at the same time as that of the reference travel pattern, and is calculated such that a cumulative speed increase amount is smaller than that of the reference travel pattern. This allows the energy consumption amount of the low fuel consumption travel pattern to be lower than the energy consumption amount of the reference travel pattern. The processing of S8 is ended, whereby the control process of FIG. 2 is ended.

Figure 3:
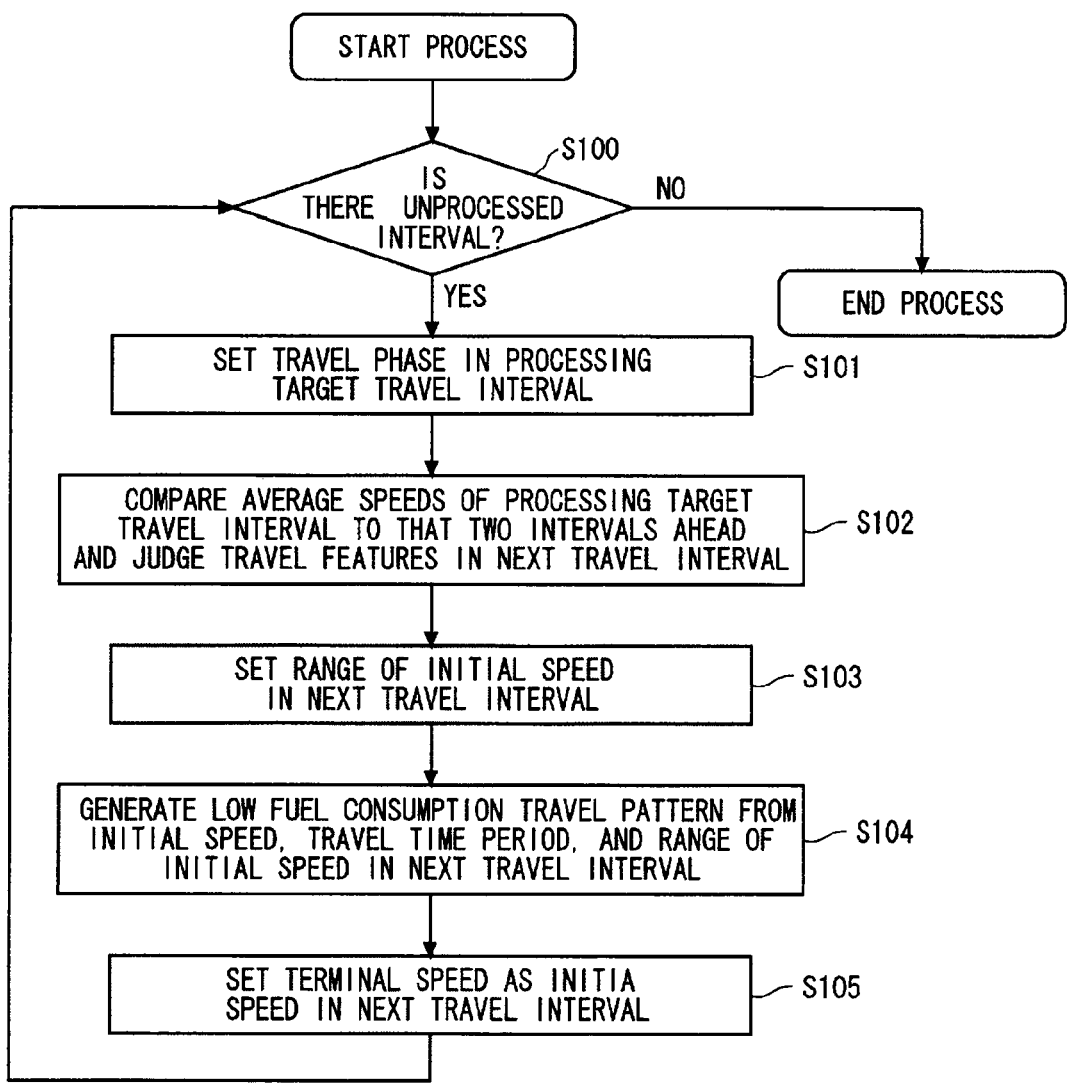
FIG. 3 is a flowchart showing an action of a low fuel consumption travel pattern generation process by a low fuel consumption travel pattern generation part of the travel pattern generation device according to the first embodiment of the present invention.

FIG. 3 is a flowchart showing an action of the process of generating a low fuel consumption travel pattern by the low fuel consumption travel pattern generation part according to the first embodiment of the present invention.

The process of generating a low fuel consumption travel pattern shown in FIG. 3 shows the details of the process of generating a low fuel consumption travel pattern shown in S8 of FIG. 2, and the low fuel consumption travel pattern is generated by the low fuel consumption travel pattern generation part 5 for every travel interval of the travel route in order from the position at which a vehicle starts traveling, and the generation is ended at the time of the completion of the process for every travel interval.

As shown in FIG. 3, the low fuel consumption travel pattern generation part 5 starts the process of generating a low fuel consumption travel pattern, and then, in S100, the low fuel consumption travel pattern generation part 5 judges whether or not a travel interval (unprocessed travel interval) in which the process of generating a low fuel consumption travel pattern has not been performed is present on the travel route. In a case where the unprocessed travel interval is not present, the process of generating a low fuel consumption travel pattern is ended, and the low fuel consumption travel pattern is decided. In a case where the unprocessed travel interval is present, the unprocessed travel interval is regarded as the processing target travel interval, and then the process moves to the processing of travel phase setting S101.

In S101, the low fuel consumption travel pattern generation part 5 compares the initial speed of the processing target travel interval and the average speed of the processing target travel interval, and then determines the travel phase of the processing target interval as to whether a vehicle is in the acceleration phase or deceleration phase. A vehicle is in the acceleration phase when the average speed is larger than the initial speed and in the deceleration phase when the average speed is smaller than the initial speed.

In S102, the low fuel consumption travel pattern generation part 5 judges the features of the travel in the next travel interval following the processing target travel interval. In this processing, the low fuel consumption travel pattern generation part 5 compares the average speeds of the processing target travel interval to the travel interval two intervals ahead (subsequent travel interval), thereby determining the travel phase of the next travel interval through comparison with the adjoining travel intervals.

FIG. 4 is a figure of speed patterns showing examples of judging the travel phases compared with the travel intervals adjacent to the travel interval by the low fuel consumption travel pattern generation part according to the first embodiment of the present invention.

The method of judging the travel phase in the next interval by the low fuel consumption travel pattern generation part 5 in S102 is described with reference to FIG. 4. In (a) portion of FIG. 4, "the average speed in the processing target travel interval<the average speed in the next travel interval<the average speed in the subsequent travel interval". In the case of (a) portion of FIG. 4, the low fuel consumption travel pattern generation part 5 considers the next travel interval to be in the course of acceleration from the processing target travel interval to the subsequent travel interval, and judges that the travel phase in the next travel interval is "during acceleration". In (b) portion of FIG. 4, "the average speed in the processing target travel interval<the average speed in the next travel interval>the average speed in the subsequent travel interval". In the case of (b) portion of FIG. 4, the low fuel consumption travel pattern generation part 5 considers the next travel interval as the most recent local maximum point in speed, and judges that the travel phase in the next travel interval to be "maximum in speed". In (c) portion of FIG. 4, "the average speed in the processing target travel interval>the average speed in the next travel interval>the average speed in the subsequent travel interval". In the case of (c) portion of FIG. 4, the low fuel consumption travel pattern generation part 5 considers the next travel interval to be in the course of deceleration from the processing target travel interval to the subsequent travel interval, and judges that the travel phase in the next travel interval is "during deceleration". In (d) portion of FIG. 4, "the average speed in the processing target travel interval>the average speed in the next travel interval<the average speed in the subsequent travel interval". In the case of (d) portion of FIG. 4, the low fuel consumption travel pattern generation part 5 considers the next travel interval as the most recent local minimum point in speed, and judges that the travel phase in the next travel interval to be "minimum in speed". In the case where the next travel interval or subsequent travel interval is not present, the low fuel consumption travel pattern generation part 5 handles the absent travel interval as one in which the average speed is zero, and makes a judgment in a similar manner.

In S103, the low fuel consumption travel pattern generation part 5 determines the initial speed in the next travel interval that is required for the generation of the optimum speed pattern in the next travel interval, from the set acceleration, the travel phase in the processing target travel interval that has been determined in S101, the travel phase in the next travel interval that has been judged in the processing of S102, and respective average speeds of the processing target travel interval to the subsequent travel interval.

The range of the initial speed in the next travel interval is set so as to prevent, in determining the low fuel consumption travel pattern in the next travel interval, a situation in which there are no solutions or unnatural acceleration/deceleration such as steep acceleration has to be performed. For example, in the case where the processing target travel interval is in the acceleration phase and the next travel interval is during acceleration, the initial speed in the next travel interval has to fall within the range in which acceleration is allowed at least to the average speed in the subsequent travel interval.

In S104, the low fuel consumption travel pattern generation part 5 generates the low fuel consumption travel pattern in the processing target travel interval based on the initial speed in the processing target travel interval, travel time period, and the range of the initial speed in the next travel interval that has been set in S103. The low fuel consumption travel pattern in the processing target travel interval is generated under the conditions where the travel time period is the same as that in the reference travel pattern so as not to exceed the upper limit speed for each predetermined point on the travel route that has been set in S4 and not to perform acceleration/deceleration as much as possible. This enables the low fuel consumption travel pattern generation part 5 to generate the low fuel consumption travel pattern such that a vehicle passes through the reference point, at which the vehicle is stopped or decelerated in the reference travel pattern, at the same time without making a stop, thereby reducing energy consumption due to acceleration.

Further, the low fuel consumption travel pattern generation part 5 may generate the low fuel consumption travel pattern such that a vehicle travels at a minimum constant speed and stop at the reference point in a case where the vehicle cannot pass through the reference point without making a stop unless the vehicle travels at a constant speed equal to or less than the preset minimum constant speed. This prevents a situation in which a vehicle travels at an extremely low speed, leading to an increase of energy consumption or adverse effects on traffic. Moreover, the low fuel consumption travel pattern generation part 5 may generate the low fuel consumption travel pattern in which a vehicle arrives early at a light located before a descending slope or at a slope and stops so as to promote idling stop. This is because in the case of descending slope in start, the potential energy can be used as the energy in start, leading to less energy consumption. Therefore, the travel time period of each travel interval in the low fuel consumption travel pattern is not required to be precisely identical to the travel time period in the reference travel pattern but is only required to fall within a predetermined range.

In addition, when the maximum speed in the low fuel consumption travel pattern of the preceding interval is large in two contiguous travel intervals where light information indicating the indication schedule of a light can be obtained with light sandwiched therebetween, the low fuel consumption travel pattern generation part 5 may ease the time constraints and generate the low fuel consumption travel pattern by reducing the maximum speed in the preceding travel interval within the range in which the indication of the light does not change from green. This allows optimization of a speed difference not only within the travel interval but also between the travel intervals, thereby determining a travel pattern in which energy is less consumed.

The processing of S104 is ended, and then the calculated terminal speed of the low fuel consumption travel pattern is set as the initial speed in the next travel interval (S105). Then, the process returns to judgment of an unprocessed travel interval (S100).

Figure 5:
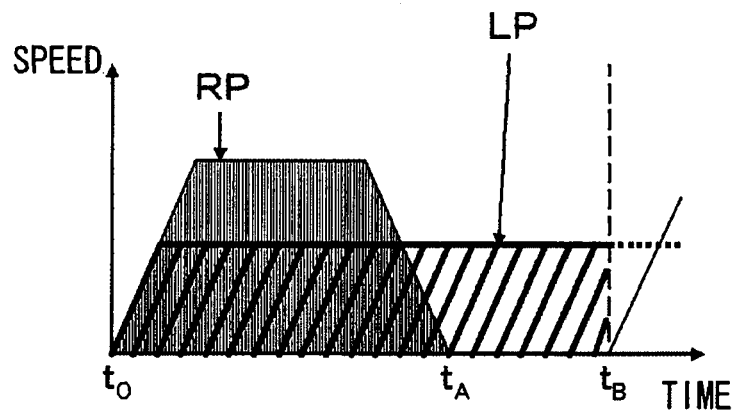
FIG. 5 is a figure showing examples of a reference travel pattern in a travel interval in which a signal is present at the end generated by the travel pattern generation device according to the first embodiment of the present invention and a low fuel consumption travel pattern that is obtained based on the reference travel pattern.

FIG. 5 is a figure showing examples of a reference travel pattern in a travel interval in which a signal is present at the end generated by the travel pattern generation device according to the first embodiment of the present invention and a low fuel consumption travel pattern obtained based on the reference travel pattern. In FIG. 5, a vertical axis represents a speed and a horizontal axis represents a time. In FIG. 5, further, a thin line represents the reference travel pattern (RP in the figure) and a thick line represents the low fuel consumption travel pattern (LP of the figure).

In the example shown in FIG. 5, the travel time period in the travel interval is from a time $t_0$ to a time $t_B$. In the reference travel pattern RP shown in FIG. 5, a vehicle is accelerated from the time $t_0$, arrives at the position of a red light and stops, and is accelerated again at the time $t_B$ when the indication of the signal changes to green. In the case of the travel interval in which a vehicle is expected to stop at a red light in the reference travel pattern as described above, the low fuel consumption travel pattern generation part 5 determines the low fuel consumption travel pattern LP in the travel interval such that a vehicle arrives at a position of a light at a timing at which the vehicle is accelerated again, that is, at the time $t_B$ that is the timing at which the indication of the light changes to green. For that purpose, the low fuel consumption travel pattern generation part 5 is desired to reduce the constant travel speed and determine the low fuel consumption travel pattern LP so that the area of a vertical line portion surrounded by the reference travel pattern and the time axis coincides with the area of an oblique line portion surrounded by the low fuel consumption travel pattern LP and the time axis.

Next, description is given of examples of a reference travel pattern over a plurality of travel intervals and a low fuel consumption travel pattern generated based on the reference travel pattern over the plurality of travel intervals.

Figure 6:
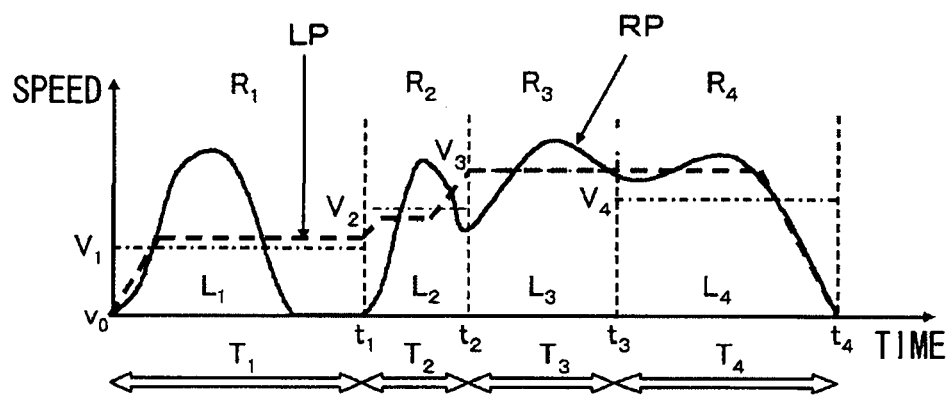
FIG. 6 is a figure showing examples of a reference travel pattern over a plurality of travel intervals generated by the travel pattern generation device according to the first embodiment of the present invention and a low fuel consumption travel pattern that is generated based on the reference travel pattern over the plurality of travel intervals.

FIG. 6 is a figure showing examples of the reference travel pattern RP over a plurality of travel intervals generated by the travel pattern generation device according to the first embodiment of the present invention and the low fuel consumption travel pattern LP generated based on the reference travel pattern RP over the plurality of travel intervals. In FIG. 6, a vertical axis represents a speed and a horizontal axis represents a time. In FIG. 6, further, a solid line represents the reference travel pattern RP, a broken line represents the low fuel consumption travel pattern LP, and a dashed line represents an average speed in each travel interval.

First, the travel interval division part 4 divides the travel route into four travel intervals ($R_1$ to $R_4$) based on the reference travel pattern RP by a solid line. The travel interval division part 4 divides the travel route with the positions of the lights such as a time t1 and a time t3 and the point such as a time $t_2$, which is shown to be concave (or convex) in a case where a vehicle is decelerated for a predetermined amount or more and then accelerated (or is accelerated for a predetermined amount or more), as reference points. Next, travel features such as average speeds ($V_1$ to $V_4$), travel distances ($L_1$ to $L_4$) and travel time periods ($T_1$ to $T_4$) for the respective travel intervals are extracted, and the process of generating a low fuel consumption travel pattern is performed on travel intervals in chronological order.

For example, in the process of generating a low fuel consumption travel pattern in the travel interval $R_1$, first, an initial speed v0 and the average speed $V_1$ in the travel interval $R_1$ are compared with each other, and it is judged that the travel phase in the processing target travel interval $R_1$ is the "acceleration phase" (S101 of FIG. 3). Next, the respective average speeds ($V_1$ to $V_3$) in the travel intervals from the processing target travel interval $R_1$ to that two intervals ahead (subsequent travel interval $R_3$) are referred to, and it is judged that the travel phase compared with the adjacent interval to the next travel interval $R_2$ is "during acceleration" (S102 of FIG. 3). Then, the range of the initial speed in the next travel interval $R_2$ allowable in the next travel interval $R_2$ is set from the travel phase in the processing target travel interval $R_1$, the travel phase compared with the adjacent interval to the next travel interval $R_2$, the respective average speeds ($V_1$ to $V_3$) in the travel intervals from the processing target travel interval $R_1$ to that two intervals ahead (subsequent travel interval $R_3$), and the set acceleration (S103 of FIG. 3).

The low fuel consumption travel pattern LP represented by a broken line is generated as a travel pattern in which acceleration (cumulative speed increase amount) is least under the conditions that a vehicle is capable of traveling the travel distance $L_1$ in the travel time period $T_1$ at the determined acceleration from the initial speed v0 and that the terminal speed falls within the set range of the initial speed in the next travel interval $R_2$. As a result, in the low fuel consumption travel pattern LP, a vehicle is capable of arriving at the light position at the time $t_1$ when the vehicle is accelerated again in the reference travel pattern RP, which enables the vehicle to travel without making a stop at a light position. The travel pattern in which acceleration is performed least is the pattern in which a vehicle is accelerated to an appropriate speed at the acceleration determined as in the processing target travel interval $R_1$ and then fixed to a constant speed as long as the terminal speed falls within the setting range of the initial speed in the next interval.

Similarly, in a case where the travel interval $R_2$ is the processing target travel interval, the processing target travel interval $R_2$ is in the "acceleration phase", and it is judged that the travel phase compared with the adjacent interval to the subsequent travel interval $R_3$ is "maximum in speed". The range of the initial speed allowable in the subsequent travel interval $R_3$ is set from the travel phase in the processing target travel interval $R_2$, the travel phase compared with the adjacent interval to the subsequent travel interval $R_3$, respective average speeds in the travel intervals from the processing target travel interval $R_2$ to that two intervals ahead, and the preset acceleration. In using the travel pattern in which a vehicle is accelerated and then fixed to a constant speed as in the travel interval $R_1$, in a case where the terminal speed in the processing target travel interval is out of the range of the initial speed allowable in the next travel interval, a speed is adjusted at the end of the travel interval with the use of the acceleration/deceleration set as in the travel interval $R_2$.

Described below as a simpler technique for generating a low fuel consumption travel pattern is the method of determining a change pattern of a speed at a boundary between travel intervals such that the speed becomes closer to the average speed of each travel interval as much as possible.

In this technique, the low fuel consumption travel pattern is based on average speeds of the respective travel intervals, and a transition of speed in adjacent travel intervals (processing target travel interval and next travel interval) is interpolated by a straight line passing through the average value (middle point in plane of time-speed) of the average speeds.

Figure 7:
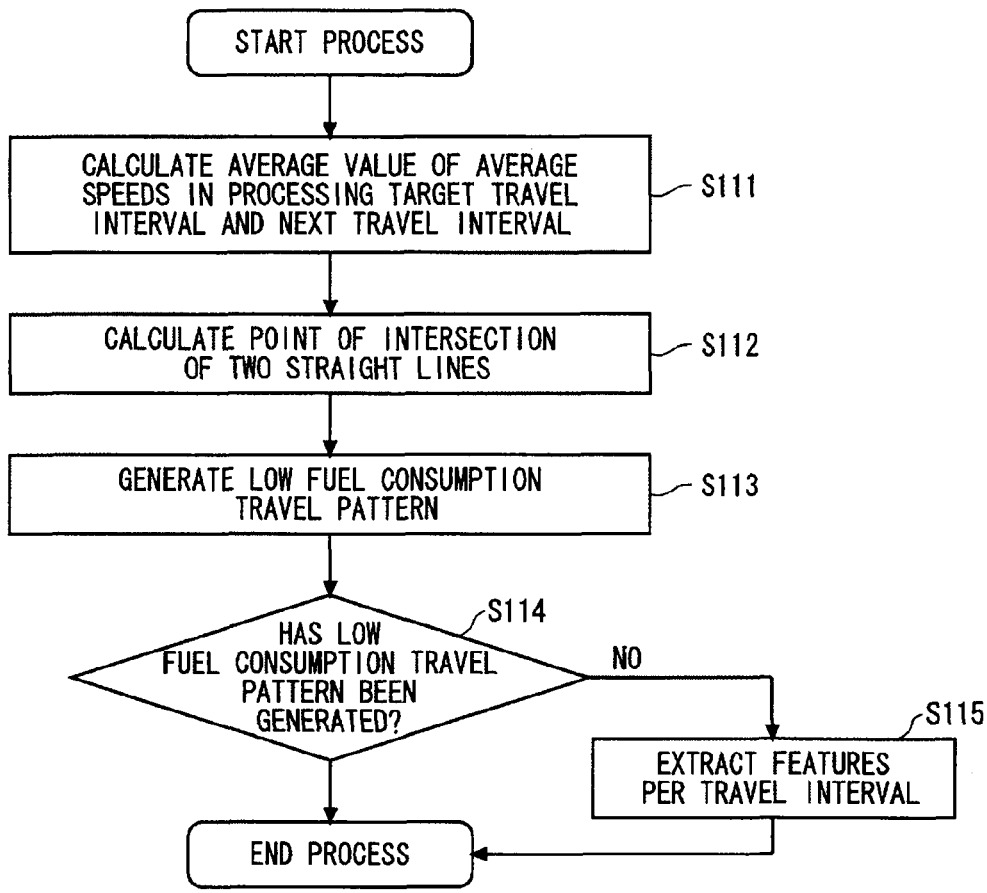
FIG. 7 is a flowchart showing an action by a simple generation technique by a low fuel consumption travel pattern generation part of the travel pattern generation device according to the first embodiment of the present invention.
Figure 8:
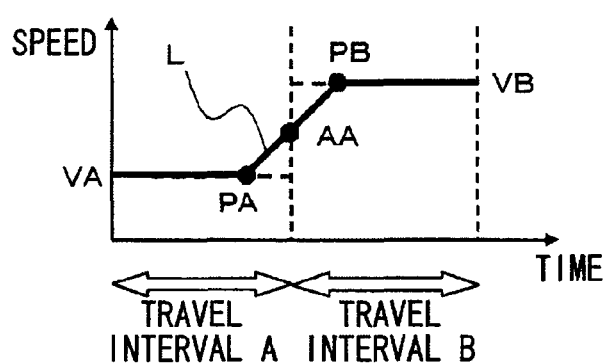
FIG. 8 is a figure showing an example of generating a low fuel consumption travel pattern by the simple generation technique by the low fuel consumption travel pattern generation part of the travel pattern generation device according to the first embodiment of the present invention.

FIG. 7 is a flowchart showing an action by the simple generation method by the low fuel consumption travel pattern generation part of the travel pattern generation device according to the first embodiment of the present invention. FIG. 8 is a figure showing an example in which a low fuel consumption travel pattern is generated by the simple generation method by the low fuel consumption travel pattern generation part of the travel pattern generation device according to the first embodiment of the present invention.

The use of the technique shown in FIG. 7 in place of S8 (S101 to S105 shown in FIG. 3) of the flowchart shown in FIG. 2 enables to calculate a low fuel consumption travel pattern by a smaller calculation amount.

First, in S111, an average value AA of the average speeds (VA and VB for the travel interval A and the travel interval B, respectively) in the two adjacent travel intervals (travel interval A and travel interval B shown in FIG. 8) is determined.

Next, in S112, points of intersection (point of intersection PA and point of intersection PB) of a straight line LL that passes through the average value AA determined at the boundary between the above-mentioned two travel intervals and has a slope set in advance (set values of acceleration and deceleration) and two straight lines respectively showing the average speeds in the above-mentioned two travel intervals. The slope is adjusted in a case where calculation cannot be made with the slope set in advance due to, for example, an insufficient time period per travel interval.

In S113, the low fuel consumption travel pattern represented by a thick line of FIG. 8 is calculated by two line segments showing the average speeds in two adjacent travel intervals that have been obtained in S111 and the line segment that passes through the average value AA of the average speeds in the two travel intervals and the points of intersection (point of intersection PA and point of intersection PB) obtained in S112.

In S114, in a case where two adjacent travel intervals cannot be defined, the process proceeds to S115, and the low fuel consumption travel pattern is calculated by three straight lines so as to satisfy the travel distance in the processing target travel interval from the average speeds in travel intervals at both ends adjacent to the processing target travel interval.

As described above, the travel pattern generation device 1 according to the first embodiment of the present invention is capable of generating a travel pattern in which unnecessary acceleration is reduced and the energy consumed by a vehicle is reduced further. In addition, a travel pattern in which energy consumption is small in accordance with a shape of a travel route and a traffic situation during the travel can be generated by obtaining the travel route information such as a speed limit on the travel route and a light position, the traffic situation information such as a light indication schedule and a position of the tail end of a line of vehicles waiting at a light, and the route shape information such as a curve.

Further, the travel pattern generation device 1 according to the first embodiment of the present invention is capable of traveling a travel pattern in which energy consumption is small because a driver can drive in the travel pattern in which the accumulation of speed increase amount is reduced more compared with the case of driving without consideration of acceleration/deceleration due to a traffic situation such as a light, that is, energy consumption. Moreover, traveling in the same travel time period as that in the reference speed pattern can be assured, which does not lead to a situation in which the travel time period increases due to consideration of low fuel consumption travel.

Further, according to the travel pattern generation device 1 of the first embodiment of the present invention, the time when a vehicle passes through a reference point such as a light, where passing-through time is constrained, does not vary considerably from the reference travel pattern, which less affects a following vehicle. In the travel interval in which a vehicle stops due to red light, the vehicle passes through a signal at the timing at which a light changes to green next, and accordingly a following vehicle is also capable of passing through the light at an approximately identical timing to that in the case where own vehicle travels in the reference speed pattern. This minimizes the influence of travel time period for the following vehicle.

Further, the travel pattern generation device 1 according to the first embodiment of the present invention is capable of generating a low fuel consumption travel pattern analytically based on the information set and obtained, which reduces a calculation amount by a larger amount compared with one that generates a low fuel consumption travel pattern by iterative calculation.

Second Embodiment

A travel pattern generation device 11 according to a second embodiment generates a low fuel consumption travel pattern serving as evaluation criteria based on the travel history including a travel route for evaluating the travel after a vehicle travels. The travel pattern generation device 11 according to the second embodiment generates a low fuel consumption travel pattern for the travel in the past, whereas the travel pattern generation device 1 according to the first embodiment generates a low fuel consumption travel pattern of a route that a vehicle is to travel, which is a difference therebetween. In the second embodiment, a difference from the travel pattern generation device 1 described in the first embodiment is mainly described.

Figure 9:
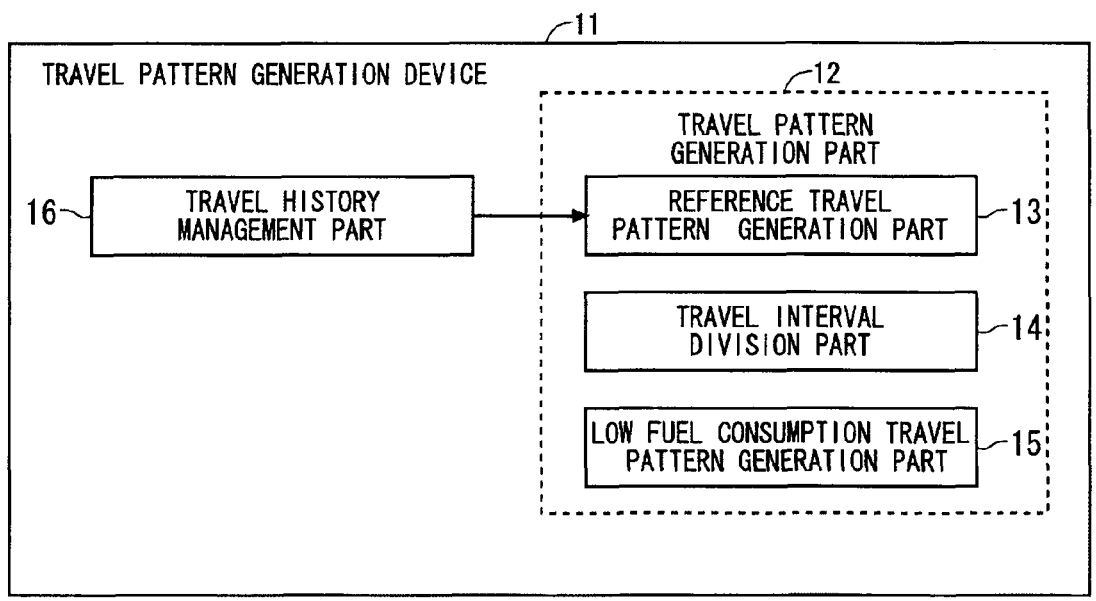
FIG. 9 is a block diagram showing a configuration of a travel pattern generation device according to a second embodiment of the present invention.

FIG. 9 is a block diagram showing the configuration of the travel pattern generation device according to the second embodiment of the present invention.

The travel pattern generation device 11 includes a travel history management part 16 and a travel pattern generation part 12. The travel pattern generation device 11 according to the second embodiment does not include the traffic situation detection part 6, vehicle information detection part 7, current position specification part 8 and travel route specification part 9 included in the travel pattern generation device 1 described in the first embodiment and generates a low fuel consumption travel pattern with the use of travel history information held by the travel history management part 16.

The travel history management part 16 obtains the travel route, time, travel speed and travel distance of the travel of a vehicle and stores those as the travel history information, and outputs the stored travel history information to the travel pattern generation part 12. The travel route information included in the travel history information includes point of intersection information or the route length, speed limit, light position information, curve information and the presence or absence of right/left turn, similarly to the travel route information handled by the travel route specification part 9 of the travel pattern generation device 1 according to the first embodiment shown in FIG. 1. Alternatively, as a piece of the travel history information, traffic situation information including the vehicle surrounding information such as the presence or absence of a vehicle ahead with the use of a millimeter wave sensor or the like.

The travel pattern generation part 12 includes a reference travel pattern generation part 13, a travel interval division part 14 and a low fuel consumption travel pattern generation part 15. The travel pattern generation part 12 generates a low fuel consumption travel pattern in which energy consumption is reduced than the reference travel pattern with the travel time period identical to that in the travel history, based on the travel history information input from the travel history management part 16, in consideration of a traffic situation at the same time and on the same route as those of the travel history.

The reference travel pattern generation part 13 generates a reference travel pattern using the travel history information obtained from the travel history management part 16. The reference travel pattern generation part 13 described in the second embodiment sets the travel pattern serving as the travel history to be evaluated as the reference speed pattern, whereas the reference travel pattern generation part 3 described in the first embodiment generates a model travel pattern on the expected travel route, which is a difference therebetween. Further, the reference travel pattern generation part 13 has a function of converting the travel history into information that is easily evaluated by, for example, smoothing a speed when registering the travel history as a reference speed pattern.

The travel interval division part 14 has identical configuration and function to those of the travel interval division part 4 according to the first embodiment, and divides the travel route into a plurality of travel intervals based on the reference speed travel pattern generated by the reference travel pattern generation part 13.

The low fuel consumption travel pattern generation part 15 has identical configuration and function to those of the low fuel consumption travel pattern generation part 5 according to the first embodiment and, regarding each travel interval divided by the travel interval division part 4, generates a low fuel consumption travel pattern in which energy consumption is reduced than the reference travel pattern such that the travel time period is identical to that of the reference travel pattern.

Figure 10:
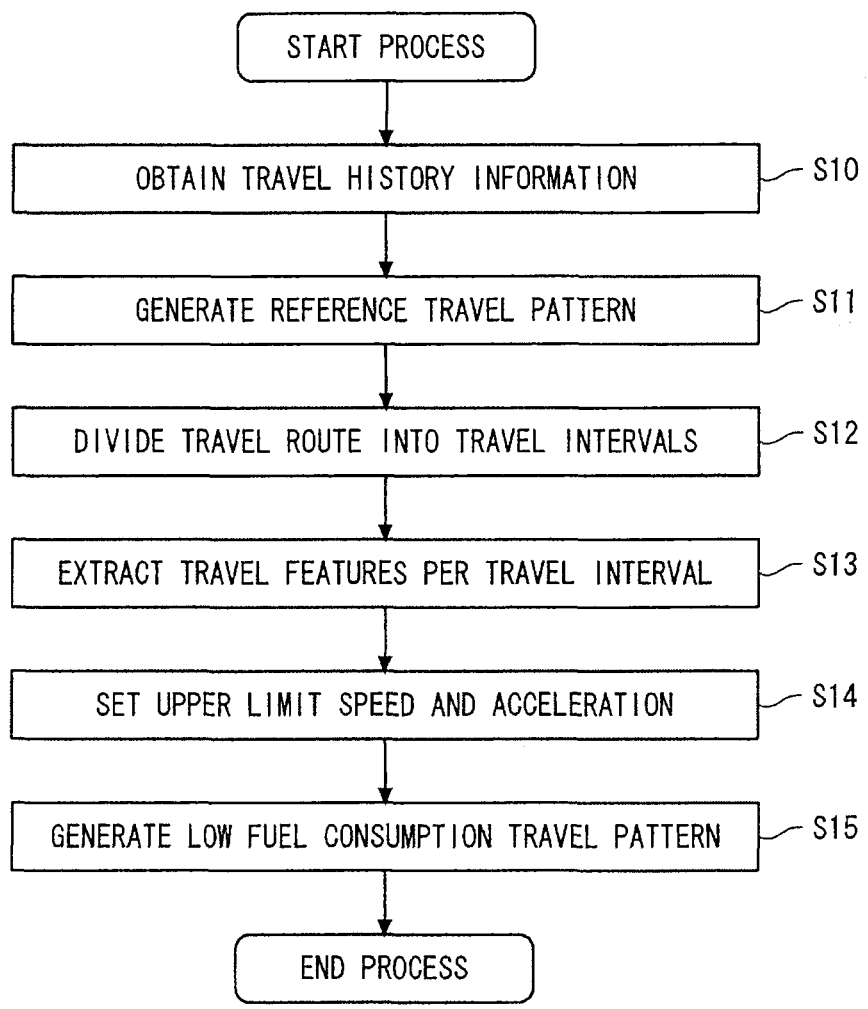
FIG. 10 is a flowchart showing an action of the travel pattern generation device according to the second embodiment of the present invention.

FIG. 10 is a flowchart showing an action of the travel pattern generation device according to the second embodiment of the present invention. The action of the travel pattern generation device 11 according to the second embodiment is described.

The process of travel pattern generation by the travel pattern generation device 11 shown in FIG. 10 is performed after the travel or at a predetermined timing during the travel. For example, the process of travel pattern generation is repeatedly performed in a case where a vehicle arrives at a destination set by a driver, at predetermined time periods, at predetermined distances. Alternatively, the process of travel pattern generation may be repeatedly performed every time, for example, a vehicle stops at a light.

In FIG. 10, the process of travel pattern generation is started from the processing of obtaining the travel history information in S10. In S10, the reference travel pattern generation part 13 obtains the travel history information to be evaluated from the travel history management part 16. The travel history information is obtained from, for example, the range from immediately after the travel was started or the last time the travel was evaluated to immediately before the process of travel pattern generation is started this time.

In S11, the reference travel pattern generation part 13 generates the reference travel pattern with the use of the travel history information obtained in S10. The reference travel pattern generation part 13 converts the travel history information into data easily handled by the travel interval division part 14 or the low fuel consumption travel pattern generation part 15 by, for example, smoothing the travel speed with respect to the travel time period in the travel history information using the moving average method or the like or by skipping data, to thereby register the converted data as the reference travel pattern.

In S12, the travel interval division part 14 sets the reference points using the reference travel pattern generated in S11 and the travel route information included in the travel history information obtained in S10, and then divides the travel route into a plurality of travel intervals based on the set reference points. As to the reference points for division, similarly in the interval division processing S6 performed by the travel interval division part 4 described in the first embodiment, the point at which a passing-through time is limited is set as a reference point in accordance with, for example, a light position or a traffic situation in a case where, for example, another vehicle is present ahead due to an influence of a traffic signal. In a case where the travel route information included in the travel history information includes the information regarding the presence or absence of a vehicle ahead, it is possible to obtain a low fuel consumption travel pattern for reducing energy consumption further by dividing intervals with the use of the information regarding the presence or absence of a vehicle ahead.

In S13, the travel interval division part 14 extracts the features of the respective travel intervals divided in S12. The feature extraction processing shown in S13 is identical to the processing of travel feature extraction shown in S7 of the first embodiment.

In S14, the low fuel consumption travel pattern generation part 15 sets the upper limit speed and acceleration in the low fuel consumption travel pattern, based on the travel history information obtained in S10. The upper limit speed is set for each point on the travel route based on, for example, legal speed limit, curve information, presence or absence of right/left turn, and traffic information of the travel route in the travel route information of the travel history. For example, the upper limit speed may be determined with reference to a travel speed of the travel history information by setting the travel speed in the travel history information when turning right/left as an upper limit speed. The acceleration set in S14 is the acceleration used in generating a low fuel consumption travel pattern, which is set as in S4 described in the first embodiment.

In S15, the low fuel consumption travel pattern generation part 15 performs the processing of low fuel consumption travel pattern generation similar to that of S7 in the first embodiment. The low fuel consumption travel pattern generation part 15 calculates the travel pattern that is executed for each of the travel intervals divided in S12 such that the travel time period is the same among the travel intervals and acceleration (cumulative speed increase amount) is the least, to thereby generate the low fuel consumption travel pattern in which energy consumption can be reduced more than the reference travel pattern. Further, the low fuel consumption travel pattern is basically generated using the acceleration set in S14 so as to obtain the travel speed equal to or less than the upper limit speed set in S14. Alternatively, in a case where the minimum constant speed for regulating the minimum speed in constant travel is set and a vehicle cannot pass through a reference point without making a stop unless it travels at a speed equal to or less than the minimum constant speed, the low fuel consumption travel pattern generation part 15 generates a travel pattern such that a vehicle travels at the minimum constant speed and then stops at a reference point. This prevents an increase of energy consumption due to the travel at an extremely low speed.

As described above, the travel pattern generation device 11 according to the second embodiment is capable of generating a travel pattern in which unnecessary acceleration is reduced and the energy consumed by a vehicle is reduced further. The travel route information such as speed limit and light position and the traffic situation information such as a light indication schedule and stop due to a vehicle ahead are presumed or obtained from the travel history information, whereby it is possible to generate a travel pattern suitable for a traffic situation at the time when the travel history is recorded and the shape of a travel route with less energy consumption. Further, the low fuel consumption travel pattern in which energy consumption is reduced can be generated in the same travel time period as that of the travel history. Accordingly, through comparison between the travel history and the low fuel consumption travel pattern generated by the travel pattern generation device 11 according to the second embodiment, it is possible to evaluate the travel of a driver in which a traffic situation is considered under the conditions of the same arrival time.

Further, in the service of fuel efficiency ranking in which evaluations are made by sending travel history or the like to a server with the fuel efficiency being an indicator regarding driving of each individual person, it is possible to normalize variations in results of participants in ranking due to a difference of a travel place or the like, with the use of the travel pattern generated by the travel pattern generation device 11 according to the second embodiment as the criteria when evaluating driving of each individual person. More specifically, the fuel consumption amount in the low fuel consumption travel pattern generated by the travel pattern generation device 11 may be compared with an actual fuel consumption amount from the travel history of an individual, and an error thereof may be taken as a criterion in ranking. Used as an error value serving as a criterion may merely be a ratio of a fuel consumption amount to a fuel consumption amount in the low fuel consumption travel pattern (as smaller, the better), or may be a square error (time average value of square values of speed errors at respective times) between the low fuel consumption travel pattern and the travel pattern of the travel history. This enables, in a case of fuel efficiency ranking only based on an actual average fuel consumption amount, to solve an inequality in ranking that participants who have kept in mind economical driving when traveling in an urban area lose to participants who have mainly traveled an expressway in which a fuel consumption amount tends to be less compared with the travel in an urban area.

The invention claimed is:
1. A travel pattern generation device, comprising:
circuitry configured to:
divide, based on a reference travel pattern comprising a speed and a travel time period of a vehicle and based on travel route information indicating a travel route that said vehicle travels, said travel route into a plurality of travel intervals at a plurality of reference points;

determine a low fuel consumption travel pattern in which a travel time period of each of a plurality of travel intervals falls within a predetermined range of said travel time period of each of a corresponding plurality of travel intervals in said reference travel pattern and a cumulative speed increase amount, which is an accumulated value of speed increments in each of said plurality of travel intervals, is less than that of said reference travel pattern; and output the low fuel consumption travel pattern to improve fuel economy of the vehicle, wherein the low fuel consumption travel pattern is generated based on at least one solution to an optimization problem defined by Minimize $Q = \int_{t_0}^{t_N} f(v(t)) dt$, Subject to $\int_{t_{m-1}}^{t_m} v(t) dt = L_n$, $T_{n\ min} \leq t_n \leq T_{n\ max}$, $n = 1, \ldots, N$, in which Q represents a fuel consumption amount, $t_n$ represents a travel end time of an nth travel interval, $L_n$ represents a distance associated with the nth travel interval, $T_{n\ min}$ represents a minimum allowed time at the travel end time $t_n$, and $T_{n\ max}$ represents a maximum allowed time at the travel end time $t_n$.

2. The travel pattern generation device according to claim 1, wherein the circuitry is further configured to generate the reference travel pattern based on the travel route information and traffic situation information.

3. The travel pattern generation device according to claim 1, wherein the circuitry is further configured to generate the reference travel pattern based on a travel history of the vehicle.

4. The travel pattern generation device according to claim 1, wherein the circuitry is further configured to divide the travel route with a light position of the reference travel pattern, a stop position of the vehicle or a position at which the vehicle is accelerated after being decelerated by a predetermined amount or more serving as said reference point.

5. The travel pattern generation device according to claim 1, wherein the circuitry is further configured to divide the travel route using traffic situation information.

6. The travel pattern generation device according to claim 5, wherein the circuitry is further configured to determine, based on a travel phase in a processing target travel interval obtained from an initial speed and an average speed in said processing target interval and a travel phase in a next interval compared with an adjacent interval that is obtained from average speeds of said processing target interval, said next interval and a subsequent interval, a range of an initial speed allowable in said next interval to generate the low fuel consumption travel pattern from the range of the initial speed allowable in said next interval.

7. The travel pattern generation device according to claim 1, wherein the circuitry is further configured to generate the low fuel consumption travel pattern based on average speeds in a processing travel interval, a next interval and a subsequent interval.

8. The travel pattern generation device according to claim 1, wherein the circuitry is further configured to generate the low fuel consumption travel pattern based on average speeds of a processing target interval and a next interval.

9. The travel pattern generation device according to claim 1, wherein the circuitry is further configured to generate the low fuel consumption travel pattern using a speed limit or a minimum speed.

* * * * *